United States Patent
Yoshino et al.

(10) Patent No.: US 7,588,659 B2
(45) Date of Patent: Sep. 15, 2009

(54) BONDING AID FOR POLYAMIDE RESIN AND METHOD OF BONDING WITH THE SAME

(75) Inventors: Akihiro Yoshino, Aichi (JP); Kumeo Kondo, Aichi (JP); Koji Tomoda, Aichi (JP)

(73) Assignee: Kabushiki Kaisha Katazen, Aichi (JP)

( * ) Notice: Subject to any disclaimer, the term of this patent is extended or adjusted under 35 U.S.C. 154(b) by 515 days.

(21) Appl. No.: 10/540,927

(22) PCT Filed: Dec. 18, 2003

(86) PCT No.: PCT/JP03/16238

§ 371 (c)(1),
(2), (4) Date: Jun. 29, 2005

(87) PCT Pub. No.: WO2004/063303

PCT Pub. Date: Jul. 29, 2004

(65) Prior Publication Data
US 2006/0084788 A1   Apr. 20, 2006

(30) Foreign Application Priority Data
Jan. 10, 2003  (JP) .............................. 2003-004068

(51) Int. Cl.
*C09J 177/00*   (2006.01)
*C09J 5/02*   (2006.01)

(52) U.S. Cl. ............ 156/330.9; 156/242; 156/326; 252/364; 524/291; 524/292; 524/295; 525/420

(58) Field of Classification Search ............ 252/364; 524/291, 292, 295; 525/420; 156/242, 326, 156/330.9
See application file for complete search history.

(56) References Cited

FOREIGN PATENT DOCUMENTS

| DE | 39 33 710 A1 | | 4/1990 |
| JP | 10-88075 | | 4/1998 |
| JP | 10-088075 | * | 7/1998 |
| JP | 2003-089783 | * | 3/2003 |

* cited by examiner

*Primary Examiner*—Ana L Woodward
(74) *Attorney, Agent, or Firm*—Wenderoth, Lind & Ponack, L.L.P.

(57) ABSTRACT

It is a joining auxiliary agent for a polyamide resin with which a predetermined joining face of a polyamide resin molded article is coated to ensure the joining strength between the predetermined joining face and another polyamide resin when they are joined together, and has a composition containing a compound (1), which cleaves a hydrogen bond in the polyamide resin molded article while assisting the dissolution of the polyamide resin, in an organic solvent capable of dissolving the polyamide resin.

15 Claims, 16 Drawing Sheets

FIG. 1
(a)
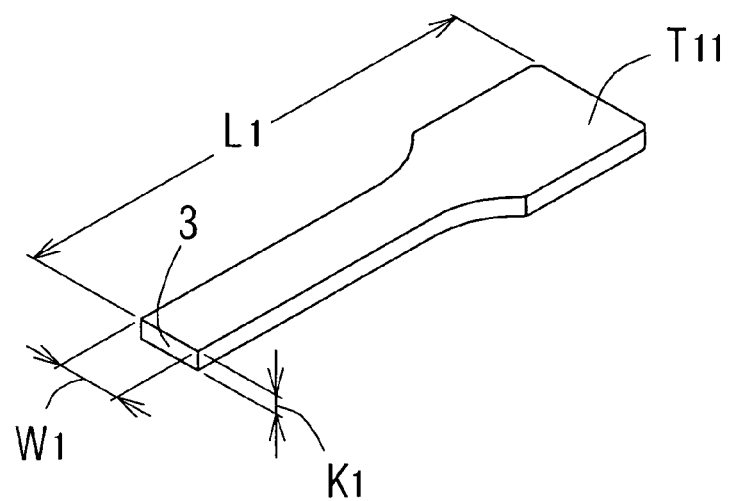
(b)
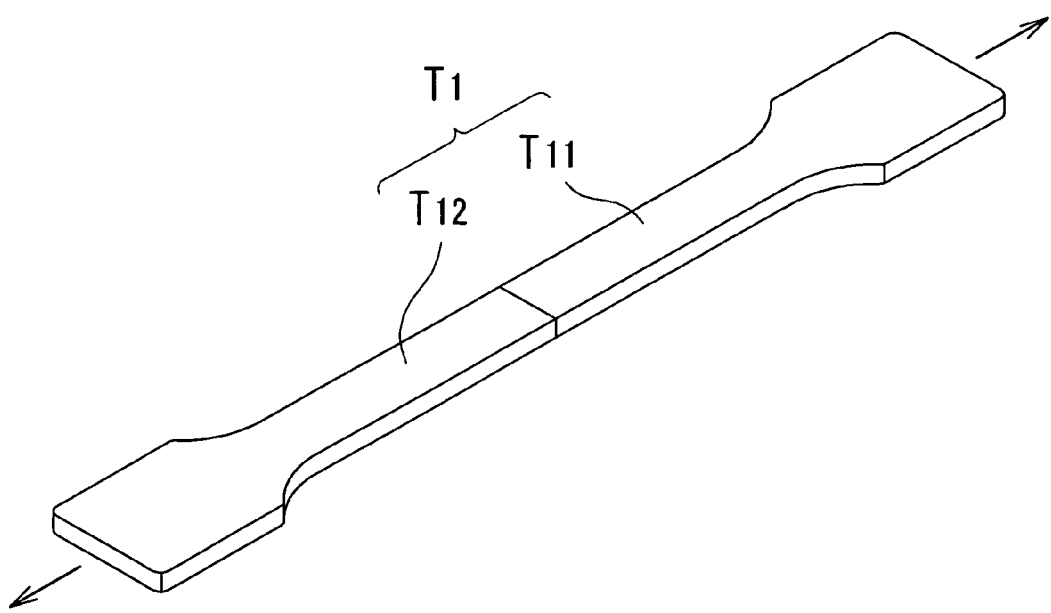

FIG. 4

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Resin for molding | | A | A | A | A | A | A | A | A | A | A | A |
| Organic solvent | Methanol (wt%) | 70.000 | 58.000 | 80.000 | | | | | 70.000 | 57.000 | 80.000 | 57.000 |
| | Isopropyl alcohol (wt%) | | | | | | | | | | | |
| | Acetonitrile (wt%) | | | | | | 80.000 | 80.000 | | | | |
| | Acetone (wt%) | | | | 80.000 | 80.000 | | | | | | |
| Total amount of organic solvents (wt%) | | 70.000 | 58.000 | 80.000 | 80.000 | 80.000 | 80.000 | 80.000 | 70.000 | 57.000 | 80.000 | 57.000 |
| Compound (1) | 1,3-dihydroxybenzene C (wt%) | 30.000 | 42.000 | | 20.000 | 20.000 | 20.000 | | 29.700 | 42.700 | | 42.999 |
| | 3,5-dihydroxybenzoate (wt%) | | | 20.000 | | | | 20.000 | | | 19.950 | |
| | 3,5-dihydroxybenzoate (D) (wt%) | | | | | | | | | | | |
| Compound (2) | Salicylic acid (wt%) | | | | | | | | | | | 0.001 |
| Total amount of compounds (wt%) | | 30.000 | 42.000 | 20.000 | 20.000 | 20.000 | 20.000 | 20.000 | 29.700 | 42.700 | 19.950 | 43.000 |
| Polyamide resin | Nylon 6 resin (wt%) | | | | | | | | 0.300 | 0.300 | 0.050 | |
| Tensile strength | MPa | 65.2 | 51.5 | 64.4 | 53.9 | 70.2 | 47.7 | 56.8 | 57.3 | 62.9 | 70.9 | 51.4 |
| Standard deviation | MPa | 7.4 | 9.5 | 4.9 | 7.8 | 0.3 | 16.3 | 13.7 | 5.1 | 1.9 | 1.2 | 7.6 |
| Ratio of organic solvents | | | | | | | | | | | | |
| C/D | | | | | | | | | | | | |

A: Nylon 6 resin
B: Nylon 66 resin

FIG. 5

| | | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Resin for molding | | A | A | A | A | A | A | A | A | A | A | A |
| Organic solvent | Methanol (wt%) | 80.000 | 60.000 | 69.000 | 65.000 | 40.000 | 69.000 | 29.000 | 70.000 | 40.000 | | |
| | Isopropyl alcohol (wt%) | | | 1.000 | 5.000 | 40.000 | 1.000 | 29.000 | 10.000 | 40.000 | 40.000 | 40.000 |
| | Acetonitrile (wt%) | | | | | | | | | | | 40.000 |
| | Acetone (wt%) | | | | | | | | | | 40.000 | |
| Total amount of organic solvents (wt%) | | 80.000 | 60.000 | 70.000 | 70.000 | 80.000 | 70.000 | 58.000 | 80.000 | 80.000 | 80.000 | 80.000 |
| Compound (1) | 1,3-dihydroxybenzene C (wt%) | 10.000 | 34.920 | 30.000 | 30.000 | | 29.700 | 41.993 | | | | |
| | 3,5-dihydroxybenzoate (wt%) | | | | | 20.000 | | | 19.920 | 19.920 | 19.980 | 19.980 |
| Compound (2) | 3,5-dihydroxybenzoate (D) (wt%) | 10.000 | 4.920 | | | | | | | | | |
| | Salicylic acid (wt%) | | | | | | | | | | | |
| Total amount of compounds (wt%) | | 20.000 | 39.840 | 30.000 | 30.000 | 20.000 | 29.700 | 41.993 | 19.920 | 19.920 | 19.980 | 19.980 |
| Polyamide resin | Nylon 6 resin (wt%) | | 0.160 | | | | 0.300 | 0.007 | 0.080 | 0.080 | 0.020 | 0.020 |
| Tensile strength MPa | | 65.0 | 61.5 | 49.3 | 59.8 | 61.7 | 57.6 | 60.6 | 70.9 | 70.9 | 69.9 | 65.6 |
| Standard deviation MPa | | 1.3 | 6.9 | 12.2 | 8.2 | 8.2 | 3.5 | 0.9 | 0.5 | 0.4 | 0.3 | 3.6 |
| Ratio of organic solvents | | | | 69.000 | 13.000 | 1.000 | 69.000 | 1.000 | 7.000 | 1.000 | 1.000 | 1.000 |
| C/D | | 1.000 | 7.098 | | | | | | | | | |

A: Nylon 6 resin
B: Nylon 66 resin

FIG. 6

| | | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|---|
| Resin for molding | | A | A | A | A | A | A | A | A | B | B | B |
| Organic solvent | Methanol (wt%) | 40.000 | 40.000 | 40.000 | 40.000 | | | | 40.000 | 40.000 | 40.000 | 40.000 |
| | Isopropyl alcohol (wt%) | 40.000 | 40.000 | 40.000 | 40.000 | 40.000 | 40.000 | 40.000 | 40.000 | 40.000 | 39.984 | 39.840 |
| | Acetonitrile (wt%) | | | | | | 40.000 | | | | | |
| | Acetone (wt%) | | | | | 40.000 | | | | | | |
| Total amount of organic solvents (wt%) | | 80.000 | 80.000 | 80.000 | 80.000 | 80.000 | 80.000 | 80.000 | 80.000 | 80.000 | 79.984 | 79.840 |
| Compound (1) | 1,3-dihydroxybenzene C (wt%) | 10.000 | 2.000 | 1.000 | 9.990 | 9.990 | 9.990 | 9.992 | 9.920 | 10.000 | 10.000 | 10.000 |
| | 3,5-dihydroxybenzoate (wt%) | | | | | | | | | | | |
| Compound (2) | 3,5-dihydroxybenzoate (D) (wt%) | 10.000 | 17.980 | 18.980 | 9.990 | 9.990 | 9.990 | 9.992 | 9.920 | 10.000 | 10.000 | 10.000 |
| | Salicylic acid (wt%) | | 0.020 | 0.020 | 0.020 | 0.020 | 0.020 | 0.016 | 0.160 | | 0.016 | 0.160 |
| Total amount of compounds (wt%) | | 20.000 | 19.980 | 19.980 | 19.980 | 19.980 | 19.980 | 19.984 | 19.840 | 20.000 | 20.000 | 20.000 |
| Polyamide resin | Nylon 6 resin (wt%) | | | | | | | | | | | |
| Tensile strength MPa | | 62.1 | 63.0 | 64.8 | 66.0 | 67.3 | 57.5 | 54.5 | 62.4 | 69.9 | 56.5 | 60.4 |
| Standard deviation MPa | | 6.9 | 4.5 | 3.0 | 1.1 | 0.9 | 16.3 | 9.8 | 9.1 | 7.2 | 14.7 | 6.9 |
| Ratio of organic solvents | | 1.000 | 1.000 | 1.000 | 1.000 | 1.000 | 1.000 | 1.000 | 1.000 | 1.000 | 1.000 | 1.000 |
| C/D | | 1.000 | 0.111 | 0.053 | 1.000 | 1.000 | 1.000 | 1.000 | 1.000 | 1.000 | 1.000 | 1.000 |

A: Nylon 6 resin
B: Nylon 66 resin

FIG. 7

| | Comparative Example 1 | Comparative Example 2 | Comparative Example 3 | Comparative Example 4 |
|---|---|---|---|---|
| Resin for molding | Nylon 6 resin | Nylon 6 resin | Nylon 66 resin | Nylon 66 resin |
| Molding method | Integral molding | Additional molding | Integral molding | Additional molding |
| Joining auxiliary agent | | Not used | | Not used |
| Tensile strength (Mpa) | 75.1 | 17.3 | 78.7 | 6.9 |
| Standard deviation (Mpa) | 0.3 | 9.8 | 1.6 | 1.6 |

FIG. 18

|  | With joining auxiliary agent | | Without joining auxiliary agent (Comparative Examples) | |
|---|---|---|---|---|
| Test No. | Nylon 6 resin | Nylon 66 resin | Nylon 6 resin | Nylon 66 resin |
| No. 1 | 21.6 | 18.2 | 2.9 | 1.7 |
| No. 2 | 12.7 | 20.0 | 2.8 | 1.7 |
| No. 3 | 20.1 | 18.0 | 4.1 | 1.1 |
| No. 4 | 15.6 | 18.4 | 3.2 | 1.7 |
| No. 5 | 19.1 | 15.9 | 3.9 | 1.4 |
| Average | 17.8 | 18.1 | 3.4 | 1.5 |
| Standard deviation | 3.6 | 1.4 | 0.6 | 0.3 |

Unit: MPa

US 7,588,659 B2

BONDING AID FOR POLYAMIDE RESIN AND METHOD OF BONDING WITH THE SAME

TECHNICAL FIELD

The present invention relates to a joining auxiliary agent with which a predetermined joining face is coated to enhance the joining strength of a molded article of a polyamide resin represented by nylon (trade name) and a joining method using the same.

BACKGROUND ART

In general, a linear polymer having an amide bond as a repeating unit in the molecule is referred to as a polyamide. In particular, a polyamide having an aliphatic chain as a main chain is widely distributed as a resin with a trade name "nylon". Typical examples thereof include nylon 66, nylon 6 and the like. A polyamide resin is a crystalline polymer, in which a hydrogen bond can be formed between amide bonds in different polymer chains. The crystal structure thereof is constituted in such a manner that the above-mentioned amide bonds are hydrogen bonded regularly in the same plane and simultaneously, each plane is arranged in a layered pattern, therefore, it is robust. Because of the polarity due to this amide bond and the above-mentioned crystal structure, a polyamide resin has an excellent resistance to a hydrocarbon-based solvent such as gasoline or oil. In addition, its thermal resistance is relatively high, and moreover, it has material strength, therefore, it is widely used as a preferred resin material for automobile parts, machine parts and the like. In order to form a part having a shape that cannot be formed by a single die molding process (e.g., an undercut structure), it is necessary that the parts with a corresponding shape be formed with a polyamide resin individually. However, in order to obtain strong joining strength, a method of treating the predetermined joining face with heat and joining polyamide resins together by close to welding has been employed conventionally.

However, for example, by using nylon 6, which is a polyamide resin, when nylon 6 in a melted state, which becomes an additional molded portion, is injected and filled to an existing molded article, which is made of nylon 6 and is placed in a metal mold, to try to join them together in accordance with the above-mentioned method, both are joined together, however, the joining strength is not sufficient. In addition, in the case where they are cooled down without being joined together, they will be separated in some cases. The cause is as follows. Some of the amide bonds in the polymer chain of nylon 6 forming a predetermined joining face that is an end surface of the existing molded article are in a free state in which they do not form a hydrogen bond because there is no polymer chain, which is an adjacent partner to be mutually hydrogen bonded in the same plane as described above.

In addition, in order to inject and fill a melted resin of nylon 6, which becomes an additional molded portion, in a metal mold, it is necessary to carry out a preliminary preparation by heating this metal mold and maintaining it at a predetermined temperature. However, the above-mentioned amide bonds in a free state in the nylon 6 forming the predetermined joining face of the above-mentioned existing molded article are trying to find a partner for a hydrogen bond for association as best they can during this heat treatment, and randomly form a hydrogen bond in an amorphous state within the polymer chains in the nylon 6 of their own.

In this way, the amide bonds in the predetermined joining face of the existing molded article to be hydrogen bonded essentially with the amide bonds in the nylon 6 in a melted state in the additional molded portion are placed in a metal mold in a state in which they already form a hydrogen bond within the polymer chains in the nylon 6 of their own, though they are in an amorphous state. Therefore, the amide bonds in the nylon 6 in a melted state in the additional molded portion to be injected in the metal mold are mutually hydrogen bonded within the polymer chains of their own as they are cooled in the metal mold after the injection. As a result, the nylon 6 in the existing molded article and the nylon 6 in the melted resin are crystallized individually, therefore, it is difficult to join them.

The same problem applies to the case where polyamide resin molded articles are subjected to ultrasonic welding. More specifically, the vibration energy caused by ultrasonic waves is directed to both of the predetermined joining faces, and the polyamide resins in the area are slightly melted by heating and mutually hydrogen bonded. Then, being cooled down, they are supposed to be joined together, however, in the process of the heat treatment, each polyamide resin molded article is crystallized individually as described above. Accordingly, in order to sufficiently weld them by directing the energy more efficiently, the above-mentioned predetermined joining face is subjected to a treatment such as a precise processing of a number of edges for ensuring the area to be contacted. Both polyamide resin molded articles are joined together, however, it is not sufficient in terms of the joining strength.

Incidentally, as a joining method that provides an appropriate joining strength by using a polyamide resin molded article, there is a resistance welding method. It is a method for molding of incorporating a conductive electric wire into an article to be molded along the outline of the article, turning on electricity thereby allowing the conductive electric wire to generate heat and to become a hot wire, and while melting the article to be molded, injecting and filling a melted polyamide resin on the melted article to be molded in the metal mold. However, the efficiency of the operation of incorporating a conductive electric wire is very low, which results in a high production cost.

Accordingly, an object of the present invention is to join polyamide resins together with sufficient joining strength.

DISCLOSURE OF THE INVENTION

In order to achieve the above-mentioned object, a gist of the present invention described in Claim 1 is a joining auxiliary agent for a polyamide resin with which a predetermined joining face of a polyamide resin molded article is coated to ensure the joining strength between the predetermined joining face and another polyamide resin when they are joined together, in which a compound (1), which cleaves a hydrogen bond in the polyamide resin molded article, while assisting the dissolution of the polyamide resin, is contained in an organic solvent capable of dissolving the polyamide resin.

Here, as the organic solvent, alcohols having 1 to 6 carbon atoms, ketones or aldehydes having 1 to 6 carbon atoms, nitriles having 1 to 6 carbon atoms are exemplified, and specifically, methanol, isopropyl alcohol, acetone, acetonitrile and the like are effective. These organic solvents are a poor solvent for a polyamide resin which can dissolve very small amount of a polyamide resin. As the compound (1), monovalent to trivalent phenols and the like are exemplified, it may be a phenol with another valency.

According to the invention of Claim 1, the following effect can be obtained. When a predetermined joining face of a polyamide resin molded article and another polyamide resin are joined, by coating the predetermined joining face with a joining auxiliary agent of this Claim 1, while a compound (1) which cleaves a hydrogen bond in the polyamide resin molded article (in the following description, also referred to as merely "compound (1)") is cleaving a hydrogen bond between the amide bonds in the adjacent polyamide polymer chains in the predetermined joining face, it forms a hydrogen bond with an amide bond whose hydrogen bond has been cleaved or an amide bond in a free state in which it does not form a hydrogen bond, whereby it can prevent the amide bonds in the predetermined joining face from forming a hydrogen bond again. In addition, the organic solvent is needed for coating the predetermined joining face thinly with the joining auxiliary agent.

Here, the action of the above-mentioned compound (1) to the predetermined joining face as described above can be confirmed by performing analysis by the infrared absorption spectra or the like, and it was found that its action is maintained until a heat treatment step. For example, as a method of joining the predetermined joining face of a molded article of a polyamide resin and another polyamide resin while performing a heat treatment, there is a method of injecting and filling a polyamide resin in a melted state of an additional molded portion to an existing molded article of a polyamide resin placed in a metal mold and joining them together. In such a case, the predetermined joining face of the existing molded article coated with the joining auxiliary agent can still maintain the activated state in which the hydrogen bonds between the amide bonds have been cleaved even after heating in the metal mold. Therefore, the polyamide resin of the existing molded article is in a more amorphous state in the predetermined joining face compared with the polyamide resin before being coated with the joining auxiliary agent, whereby it is likely to be in an amorphous state together with the amide bonds in the polyamide resin in a melted state of an additional molded portion to be injected into the metal mold. Then, in the process of cooling in the metal mold after heating, recrystallization is promoted while forming a hydrogen bond between both resins, whereby it becomes possible to join the polyamide resins with a joining strength equal to the material strength of an integral article.

A gist of the present invention described in Claim 2 is that, in the invention described in Claim 1, a polyamide resin is dissolved and contained in the above-mentioned joining auxiliary agent. Here, the polyamide resin is preferably the one which is equivalent to the above-mentioned polyamide resin molded article.

According to the invention of Claim 2, the following effect in addition to the action effect of Claim 1 can be obtained. The above-mentioned joining auxiliary agent loosens the crystal of the polyamide resin of the predetermined joining face while slightly dissolving the polyamide resin of the predetermined joining face, and cleaves the hydrogen bond between the amide bonds in the polyamide resin, and further promotes the dissolution of the polyamide resin in which the polyamide resin of the dissolved molded article was originally included thereby reducing the original unevenness of the predetermined joining face, whereby the predetermined joining face can be deformed into a physically smooth surface by the polyamide resin by itself. Therefore, the area which can contact the predetermined joining face and the polyamide resin to be joined in a state close to "plane" increases, whereby the credibility of the joining strength can be increased.

A gist of the present invention described in Claim 3 is that, in the invention described in Claim 1, a compound (2) which maintains the action of cleaving a hydrogen bond of the compound (1) which cleaves a hydrogen bond in the above-mentioned polyamide resin molded article in the above-mentioned joining auxiliary agent. Here, examples of the compound (2) include organic acids and the like, and specific examples thereof include formic acid, carboxylic acid and the like, and more specific examples thereof include carboxylic acid derivatives of monovalent to trivalent phenol, however, it may be a carboxylic acid having another valency.

According to the invention of Claim 3, the following effect in addition to the action effect of Claim 1 can be obtained. In the case where the compound (1) which cleaves a hydrogen bond in the polyamide resin molded article is a phenol, its anion is stabilized by resonating with the benzene ring, whereby it is easy to be oxidized or decomposed after dissociation, therefore, its essential action may be lost. Accordingly, in order to maintain the action of cleaving a hydrogen bond of the compound (1), a compound (2) exhibiting a smaller pKa than that of the compound (1) is added, and the compound (2) is made to dissociate itself, whereby the phenol can be prevented from being oxidized or decomposed, therefore, the action of the compound which cleaves a hydrogen bond in the polyamide resin molded article is not lost. Accordingly, the action of the compound (1) can be maintained, and the credibility of the joining strength is increased. Incidentally, in the following description, the compound (2) which maintains the action of cleaving a hydrogen bond of the above-mentioned compound (1) is referred to as merely "compound (2)"

A gist of the present invention described in Claim 4 is that, in the invention described in Claim 1, the organic solvent in the joining auxiliary agent is an organic solvent having a molecular weight of 120 or less.

According to the invention of Claim 4, the following effect in addition to the action effect of Claim 1 can be obtained. An organic solvent having a molecular weight of 120 or less has a relatively small molecule, and can easily come close to the polyamide resin. It overcomes the intermolecular force and is easy to penetrate into the molecule and moreover it is easy to evaporate. Therefore, the compound (1) in the joining auxiliary agent or the dissolved polyamide resin is easy to form a hydrogen bond with the polyamide resin of the predetermined joining face, whereby the credibility of the joining strength can be increased.

A gist of the present invention described in Claim 5 is that, in the invention described in Claim 1, the above-mentioned organic solvent is a mixed solvent of organic solvents composed of plural types thereof.

According to the invention of Claim 5, the following effect in addition to the action effect of Claim 1 can be obtained. By mixing plural types of organic solvents, such a mixed organic solvent thereof can adjust it to the vapor pressure at which the coating operation of the joining auxiliary agent is performed without any trouble (compared with the case of one type of organic solvent). About one minute after coating (assuming that the room temperature is about 20° C.), a solution state is maintained, therefore, the dissolution of the polyamide resin in the molded article soon after coating is promoted, and formation of a hydrogen bond of the compound (1) or the dissolved polyamide resin and the polyamide resin of the predetermined joining face proceeds more promptly.

A gist of the present invention described in Claim 6 is that, in the invention described in Claim 1, the above-mentioned compound (1) which cleaves a hydrogen bond in the polyamide resin molded article is 1,3-dihydroxybenzene (CAS number: RN (108-46-3)) or/and 3,5-dihydroxybenzenecarboxylic acid (CAS number: RN (99-10-5)).

According to the invention of Claim 6, the following effect in addition to the action effect of Claim 1 can be obtained.

1,3-dihydroxybenzene (CAS number: RN (108-46-3)) and 3,5-dihydroxybenzenecarboxylic acid have a hydroxyl group or a carboxyl group showing a relatively large polarity, and can preferably form a hydrogen bond with the amide bond of a polyamide. In addition, 1,3-dihydroxybenzene (CAS number: RN (108-46-3)) has a sublimation property. 1,3-dihydroxybenzene (CAS number: RN (108-46-3)) sublimates gradually after coating the predetermined joining face with the joining auxiliary agent. The thermal deformation temperature or the molding temperature of, for example, a nylon, which is a polyamide resin, is a further higher temperature, therefore, 1,3-dihydroxybenzene almost completely evaporates in the process of a heat treatment of the polyamide resin.

On the other hand, 3,5-dihydroxybenzenecarboxylic acid (CAS number: RN (99-10-5)) has a benzene ring and a hydroxyl group in the same manner as 1,3-dihydroxybenzene (CAS number: RN (108-46-3)), and has the same action effect attributable to these functional groups. However, it is a phenolic carboxylic acid derivative in which a carboxyl group is attached to the meta position of the respective hydroxyl groups. Due to this characteristic, the pKa value of 3,5-dihydroxybenzenecarboxylic acid (3.0) is smaller than that of 1,3-dihydroxybenzene (9.3), and it does not have a sublimation property. Therefore, 3,5-dihydroxybenzenecarboxylic acid remains on the joining face after both polyamide resins are crystallized, however, it conveniently fills in the region of noncrystalline or amorphous lattice defect for exerting the viscosity strength as a polyamide resin material. In addition, if 1,3-dihydroxybenzene (CAS number: RN (108-46-3)) and 3,5-dihydroxybenzenecarboxylic acid (CAS number: RN (99-10-5)) are used by appropriately mixing together, they are preferably hydrogen bonded with the amide bonds of the polyamide.

A gist of the present invention described in Claim 7 is that, in the invention described in Claim 2, the above-mentioned polyamide resin molded article is nylon 6 or nylon 66, and the polyamide resin contained in the above-mentioned joining auxiliary agent is identical to the above-mentioned polyamide resin molded article.

According to the invention of Claim 7, the following effect in addition to the action effect of Claim 2 can be obtained. Different from an aliphatic ring or an aromatic ring, which has a rigid and symmetric ring structure, there is flexibility to a certain degree in the configuration of methylene groups of the amide bonded side chains in nylon 6 or nylon 66. Therefore, the flexibility of the phase transition from crystal to noncrystal or vice versa is large, and a compound which cleaves a hydrogen bond in the polyamide resin molded article in the joining auxiliary agent is easy to act on, therefore a sufficient strength can be obtained. In addition, the polyamide resin contained in the above-mentioned joining auxiliary agent is also nylon 6 or nylon 66, which is identical to the molded article, therefore, it is easy to be inserted to the predetermined joining face, whereby the credibility of the joining strength can be increased.

A gist of the present invention described in Claim 8 is that, in the invention described in Claim 3, 1,3-dihydroxybenzene is contained in the above-mentioned joining auxiliary agent as the compound (1) which cleaves a hydrogen bond in the polyamide resin molded article, and the compound (2) which maintains the action of cleaving a hydrogen bond of 1,3-dihydroxybenzene (CAS number: RN (108-46-3)) is 3,5-dihydroxybenzenecarboxylic acid (CAS number: RN (99-10-5)) and, and/or salicylic acid (CAS number: RN (69-72-7)).

According to the invention of Claim 8, the following effect in addition to the action effect of Claim 3 can be obtained. 3,5-dihydroxybenzenecarboxylic acid suppresses the dissociation of the phenolic hydroxyl group of 1,3-dihydroxybenzene (CAS number: RN (108-46-3)) by dissociating itself in the organic solvent, and a part thereof forms a mutual hydrogen bond with 1,3-dihydroxybenzene (CAS number: RN (108-46-3)) and maintains the association state with it after the organic solvent evaporates. Therefore, it can prevent the oxidation and sublimation of 1,3-dihydroxybenzene (CAS number: RN (108-46-3)) simultaneously. Accordingly, the action of 1,3-dihydroxybenzene (CAS number: RN (108-46-3)), which is the compound (1), is not lost. Furthermore, 3,5-dihydroxybenzenecarboxylic acid (CAS number: RN (99-10-5)) can also act on as the compound (1) with regard to its hydroxyl group region and carboxyl group region, and can enhance the amorphous nature of the predetermined joining face, and moreover, it can maintain the state.

In addition, the polyamide resin in the joining auxiliary agent can also form a hydrogen bond with 1,3-dihydroxybenzene (CAS number: RN (108-46-3)), therefore, it has an action of preventing its sublimation. In this way, it can maintain the quality of the joining auxiliary agent by preventing the oxidation and decomposition of the compound (1) in the joining auxiliary agent. The organic solvent in the joining auxiliary agent evaporates soon after being applied, however, 1,3-dihydroxybenzene (CAS number: RN (108-46-3)) remains for a while without evaporating. Furthermore, 3,5-dihydroxybenzene-carboxylic acid (CAS number: RN (99-10-5)) does not evaporate, therefore, the amorphous state of the surface of the polyamide resin of the predetermined joining face can be maintained for a long time. Accordingly, even if another polyamide resin to be joined and the polyamide resin of the original molded article to be joined are not necessarily subjected to a joining treatment soon after applying the joining auxiliary agent, the joining strength of the both polyamide resins is not lost, therefore, it can apply to a variety of joining operation steps.

A gist of the present invention described in Claim 9 is that, in the invention described in Claim 4, the above-mentioned organic solvent is at 50% or higher and 90% or lower by weight.

According to the invention of Claim 9, the following effect in addition to the action effect of Claim 4 can be obtained. If the above-mentioned organic solvent is at lower than 50% by weight, it is difficult to dissolve the compound (1) or the compound (2), and if it is at higher than 90% by weight, it is difficult to contain the compound (1) or the compound (2) enough to alter the surface of the polyamide resin.

A gist of the present invention described in Claim 10 is that, in the invention described in Claim 6, the above-mentioned compound (1) is at 10% or higher and 50% or lower by weight.

According to the invention of Claim 10, the following effect in addition to the action effect of Claim 6 can be obtained. If the above-mentioned compound (1) is at lower than 10% by weight, it is difficult to alter the surface of the polyamide resin enough to be joined, and if it is at higher than 50% by weight, it cannot be dissolved in the above-mentioned organic solvent.

A gist of the present invention described in Claim 11 is that, in the invention described in Claim 7, the above-mentioned polyamide resin is at 0.005% or higher and 1.000% or lower by weight.

According to the invention of Claim 11, the following effect in addition to the action effect of Claim 7 can be obtained. If the above-mentioned polyamide resin is at lower than 0.005% by weight, it is difficult to see the effect at the joining, and if it is at lower than 1.000% by weight, the stability of the strength at the joining becomes excellent in some cases. The actual outcome will be described in the following Examples.

A gist of the present invention described in Claim 12 is that, in the invention described in Claim 5, the above-mentioned organic solvent comprises two types of organic solvents, and the mutual ratio by weight is 0.01 or higher and 100 or lower.

According to the invention of Claim 12, the following effect in addition to the action effect of Claim 5 can be obtained. If the ratio of the above-mentioned two types of organic solvents is lower than 0.01 or higher than 100, it is difficult to see the effect of mixing, however, if it is 0.01 or higher and 100 or lower, it can be adjusted to the vapor pressure at which the coating operation of the joining auxiliary agent is performed without any trouble.

A gist of the present invention described in Claim 13 is that, in the invention described in Claim 8, the mutual ratio by weight of 1,3-dihydroxybenzene (CAS number: RN (108-46-3)) and 3,5-dihydroxybenzene-carboxylic acid (CAS number: RN (99-10-5)) is 0.001 or higher and 1000 or lower.

According to the invention of Claim 13, the following effect in addition to the action effect of Claim 8 can be obtained. If the mutual ratio of 1,3-dihydroxybenzene (CAS number: RN (108-46-3)) and 3,5-dihydroxybenzene-carboxylic acid (CAS number: RN (99-10-5)) is lower than 0.001 or higher than 1000, it is difficult to see the effect of mixing, however, if it is 0.001 or higher and 1000 or lower, the oxidation and decomposition of 1,3-dihydroxybenzene can be prevented by adding 3,5-dihydroxybenzenecarboxylic acid which shows a smaller pKa than that of 1,3-dihydroxybenzene thereby allowing it to dissociate itself. Therefore, the action of the compound, which cleaves a hydrogen bond in the polyamide resin molded article, is not lost. Accordingly, the state in which the hydrogen bond in the polyamide resin of the predetermined joining face has been cleaved can be maintained, and the credibility of the joining strength is increased.

A gist of the present invention described in Claim 14 is that a joining method using a joining auxiliary agent for a polyamide resin in the invention described in Claim 1. Here, as the joining method, an injection molding joining method in which the joining auxiliary agent of this invention is applied to the predetermined joining face of an article to be molded, the article to be molded is placed in a metal mold and injection filling is performed, an ultrasonic welding method in which joining is performed by providing ultrasonic vibration to a polyamide resin molded article and the like are cited.

According to the invention of Claim 14, the following effect in addition to the action effect of Claim 1 can be obtained. By adding the joining method of the present invention to various joining methods of a polyamide resin molded article such as an injection molding joining method and an ultrasonic welding method, which are widely used in the industrial world, a joining strength equal to that of an integral molded article can be obtained. In other words, firm joining of two members by injection molding, which could not be achieved conventionally, becomes possible. In addition, in the ultrasonic welding method, the joining area of welding can be small, therefore, joining can be attained in such a manner that the joining face has a good appearance. Further, it makes a large contribution to the reduction of cost or reduction of steps in this technical field. In addition, by using the joining auxiliary agent described in Claim 1, a processed product of a polyamide resin with plural members joined firmly together can be formed by a variety of molding methods such as blow molding including injection molding and extrusion molding, or ultrasonic welding, vibration welding, etc., or even by a joining method by heating and melting a joining face such as laser welding or electromagnetic induction welding. This enables easy production at a low cost of a molded article having an undercut shape or a hollow molded article, which could not be formed in a single molding process so far by performing joining.

BRIEF DESCRIPTION OF THE DRAWINGS

FIGS. 1($a$) and 1($b$) are perspective views of an existing molded article portion $T_{11}$ of a test piece $T_1$ and the test piece $T_1$ which has been joined by injection molding, respectively.

FIG. 4 is a view showing the components of the joining auxiliary agents of Examples 1 to 11 and the experimental results for a test piece $T_1$ using the respective joining auxiliary agents.

FIG. 5 is a view showing the components of the joining auxiliary agents of Examples 12 to 22 and the experimental results for a test piece $T_1$ using the respective joining auxiliary agents.

FIG. 6 is a view showing the components of the joining auxiliary agents of Examples 23 to 33 and the experimental results for a test piece $T_1$ using the respective joining auxiliary agents.

FIG. 7 is a view showing the molding conditions for Comparative Examples 1 to 4 and the experimental results.

FIG. 18 is a view showing the results of a shearing strength test of a test piece $T_2$ in the case where the joining auxiliary agent of Example 1 was used and the case where the joining auxiliary agent was not used.

BEST MODE FOR CARRYING OUT THE INVENTION

Hereunder, as an embodiment of the present invention, a joining auxiliary agent according to the present invention and a method of injection molding of a test piece $T_1$ with a shape shown in FIG. 1 while joining with a polyamide resin with the used of the joining auxiliary agent will be described. As shown in FIG. 1, a test piece $T_1$ is a test piece with a uniform thickness and a dumbbell shape in the plan view, which is obtained by subjecting one side of an existing molded article portion $T_{11}$ with a shape, in which the dumbbell shaped $T_1$ is divided into two pieces in the longitudinal direction, to injection molding in advance, coating a predetermined joining face 3, which is the end face of its narrowed portion, with a joining auxiliary agent according to the present invention, placing $T_{11}$ in a metal mold M shown in FIG. 2 and FIG. 3, then, subjecting an additional molded portion $T_{12}$, which is the remaining shaped portion of the test piece $T_1$, to additional injection molding.

Figure 2:
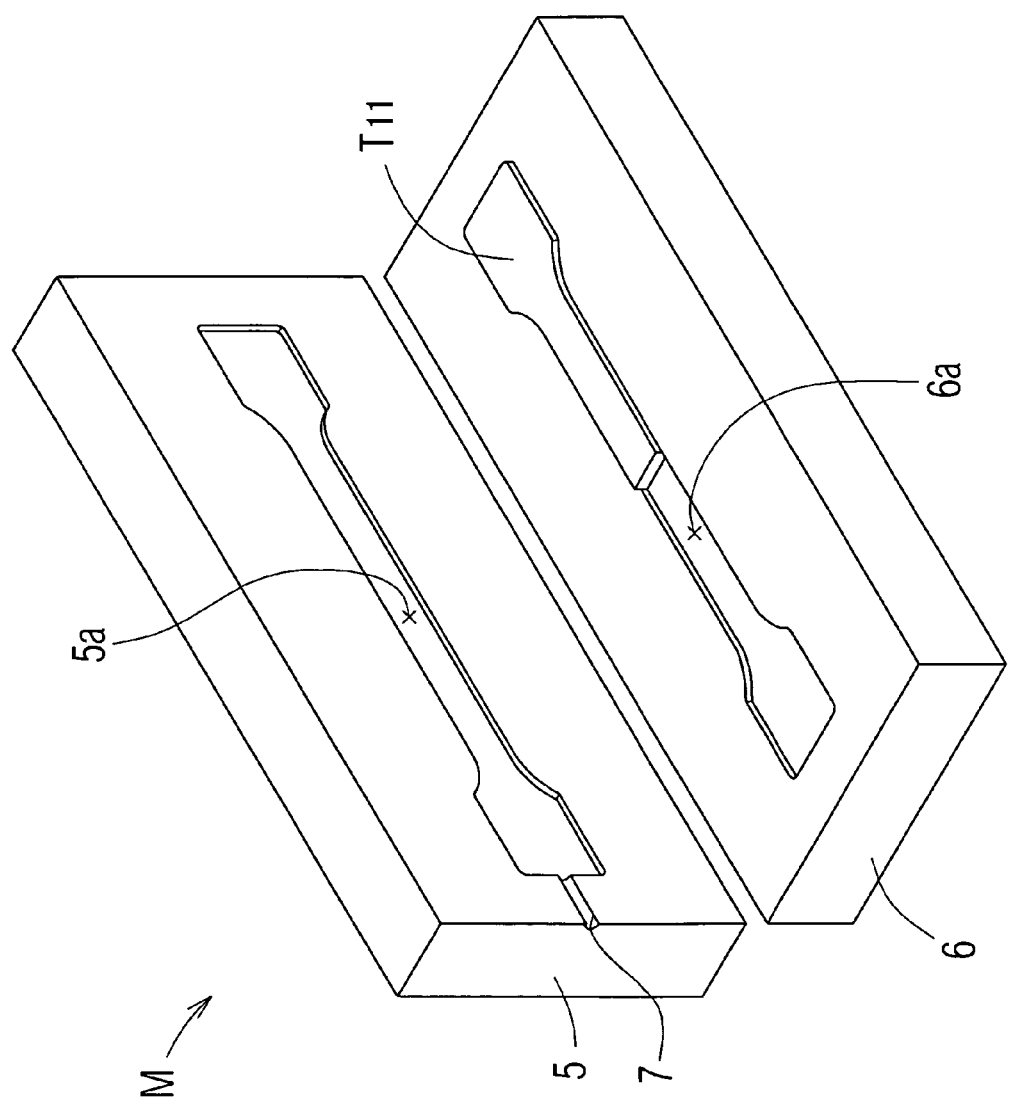
FIG. 2 is a perspective view of a metal mold M for molding a test piece $T_1$ in a separate state.
Figure 3:
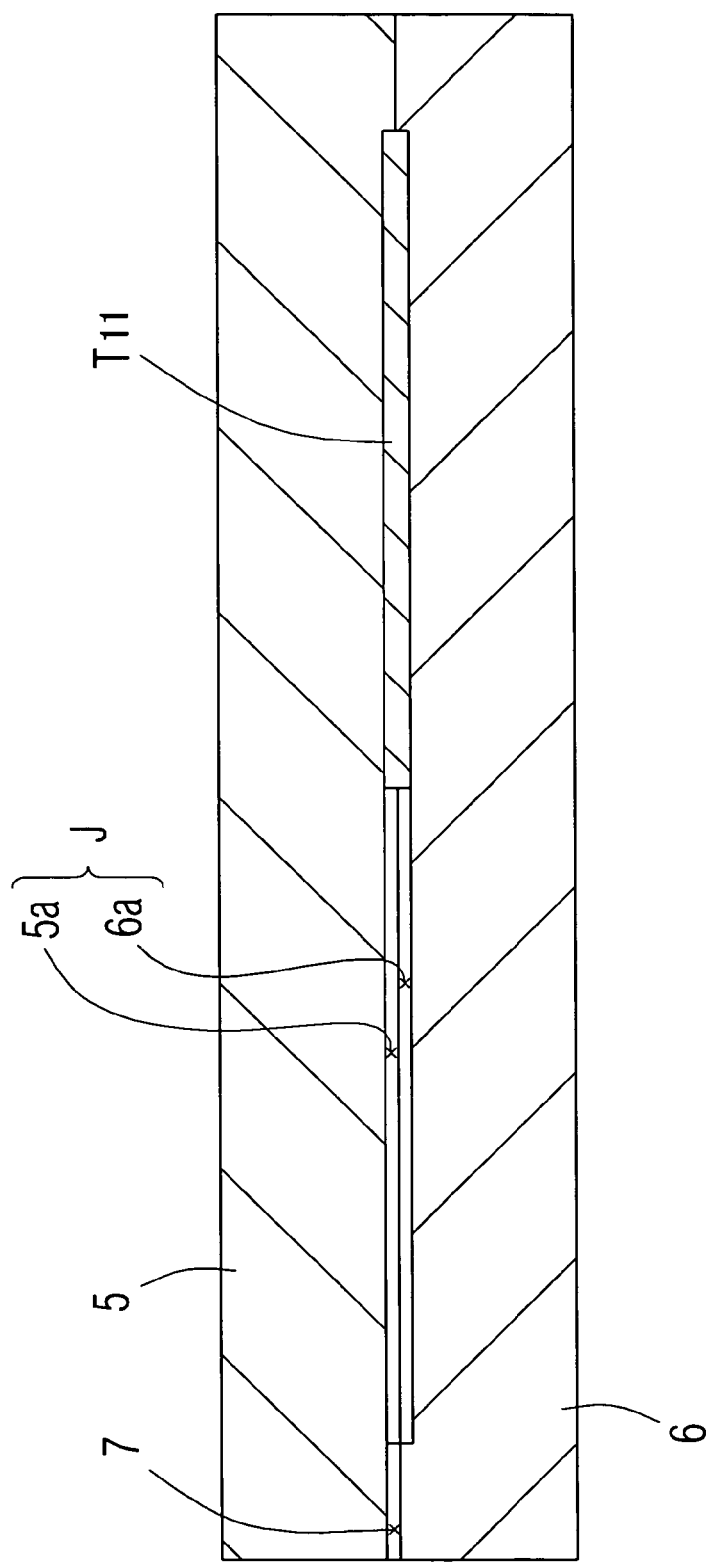
FIG. 3 is a perspective view of a state in which an existing molded article portion $T_{11}$ is placed in a metal mold M.

The metal mold M is composed of an upper mold 5 and a lower mold 6, and the upper mold 5 and the lower mold 6 have a recess 5a and a recess 6a corresponding to the shape with about a half of the thickness of the test piece $T_1$, respectively. By bringing the contact faces into closely contact with each other in a state in which both recesses 5a and 6a are allowed to face each other in the vertical direction, whereby a cavity corresponding to the shape of the test piece $T_1$ is formed. The existing molded article portion $T_{11}$ is clamped by the upper mold 5 in a state in which it has been placed in the recess 6a of the lower mold 6, and a cavity J corresponding to the shape of the additional molded portion $T_{12}$ is formed in the remaining space of the cavity. Into the cavity J, a melted resin of nylon 6 is injected, the additional molded portion $T_{12}$ is joined to the predetermined joining face 3 of the existing molded article portion $T_{11}$. Incidentally, the numeral 7 in FIG. 2 and FIG. 3 is an injection gate for injecting the melting resin in the inside of the cavity J.

The existing molded article portion $T_{11}$ and the additional molded portion $T_{12}$ have the same shape, and both have dimensions of length $(L_1) \times$ width $(W_1) \times$ thickness $(K_1) = 75 \times 10 \times 3$ mm. In the state in which both are joined together, the test piece $T_1$ with the total length of 150 mm is formed. In addition, with regard to a law material of a polyamide resin for molding the existing molded article portion $T_{11}$ and the additional molded portion $T_{12}$, as for a nylon 6 resin, Novamid 101, 3CH5 (manufactured by Mitsubishi Engineering-Plastics Co., Ltd) was used. As for nylon 66, Novamid 3010SR (manufactured by Mitsubishi Engineering-Plastics Co., Ltd) was used.

The molding conditions of injection molding are as follows. As a molding machine, Niigata Tekko NN50 Hypershot 3000 was used, and the molding temperatures were set to 231, 230, 225 and 225° C. in the order from the nozzle portion for injecting nylon 6 (Novamid 101, 3CH5). As for nylon 66 (Novamid 3010SR), they were set to 280, 275, 275 and 270° C. in the same molding machine. In any case, with regard to the temperature of the metal mold, 85° C. was defined as a set value.

The evaluation method of injection molded articles is as follows. The test piece $T_1$ whose sample number N was set to 5 left for 48 hours in a temperature controlled room in which the room temperature was 23° C. and the humidity was 50%, then, for all the Examples and Comparative Examples, a tensile test was carried out in the same temperature controlled room by using an instron type universal testing machine, "INSTRON 4505" (manufacture by INSTRON Inc). The test speed was set to 50 mm/min, and the maximum tensile strength until the test piece $T_1$ was ruptured was measured.

In FIG. 4 to FIG. 6, the components of the joining auxiliary agents of Examples 1 to 33 and the experimental results for the test piece $T_1$ using the respective joining auxiliary agents are shown, and in FIG. 7, Comparative Examples 1 to 4 are shown. In FIG. 4 to FIG. 6, as for an organic solvent, the molecular weight of methanol is 32.04, the molecular weight of isopropyl alcohol is 60.10, the molecular weight of acetonitrile is 41.05 and the molecular weight of acetone is 58.08.

In addition, the details of the test conditions and the test results for Comparative Example 1, Comparative Example 2, Comparative Example 3 and Comparative Example 4, which have the same shape as the above-mentioned test piece $T_1$ shown in FIG. 7 are as follows.

COMPARATIVE EXAMPLE 1

A test piece the entire of which was molded in the same shape as that of the test piece $T_1$ by subjecting a nylon 6 resin to a single injection molding process under the same molding conditions as those for the test piece using the joining auxiliary agent was used. As the test results, the tensile strength was 75.1 MPa and the standard deviation was 0.3 MPa.

COMPARATIVE EXAMPLE 2

A test piece obtained by performing joining while the additional molded portion $T_{12}$ was subjected to additional injection molding with a nylon 6 resin without coating the predetermined joining face 3 of the existing molded article portion $T_{11}$ with the joining auxiliary agent under the same molding conditions as those for the test piece using the joining auxiliary agent was used. As the test results, the tensile strength was 17.3 MPa and the standard deviation was 9.8 MPa.

COMPARATIVE EXAMPLE 3

A test piece the entire of which was molded in the same shape as that of the test piece $T_1$ by subjecting a nylon 66 resin to a single injection molding process under the same molding conditions as those for the test piece using the joining auxiliary agent was used. As the test results, the tensile strength was 78.7 MPa and the standard deviation was 1.6 MPa.

COMPARATIVE EXAMPLE 4

A test piece obtained by performing joining while the additional molded portion $T_{12}$ was subjected to additional injection molding with a nylon 66 resin without coating the predetermined joining face 3 of the existing molded article portion $T_{11}$ with the joining auxiliary agent under the same molding conditions as those for the test piece using the joining auxiliary agent was used. As the test results, the tensile strength was 6.86 MPa and the standard deviation was 1.6 MPa.

Each of the joining auxiliary agents of Examples 1 to 7 is composed of one type of organic solvent capable of dissolving a polyamide resin and one type of compound (1), which cleaves a hydrogen bond in a polyamide resin molded article while assisting the dissolution thereof. Each of the joining auxiliary agents of Examples 14 to 17 is composed of similar two types of organic solvents and similar one type of compound (1). A resin for molding is a nylon 6 resin in any case. As the test results, the resins are joined with a joining strength equal to the material strength of an integral article of a polyamide resin (Comparative Example 1), and with an overwhelmingly superior joining strength to that of Comparative Example 2.

Next, each of the joining auxiliary agents of Examples 8 to 10 and 17 to 22 comprises a polyamide resin in addition to an organic solvent capable of dissolving a polyamide resin and a compound (1), which cleaves a hydrogen bond in a polyamide resin molded article while assisting the dissolution thereof. The difference in the joining auxiliary agents between Examples 8 to 10 and Examples 17 to 22 is that while the former comprises one type of organic solvent, the latter comprises two types of organic solvents. A resin for molding is a nylon 6 resin in any Example. As the test results, the resins are joined with a joining strength equal to the material strength of an integral article of a polyamide resin (Comparative Example 1), and with an overwhelmingly superior joining strength to that of Comparative Example 2. In addition, as is clear from the fact that, for each of the joining auxiliary agents of Examples 1 to 7, the tensile strength is increased and the standard deviation becomes low, the credibility of the joining strength can be increased.

In addition, each of the joining auxiliary agents of Examples 13, 24 to 30, 32 and 33 comprises a compound (2), which maintains the action of cleaving a hydrogen bond of a compound (1), which cleaves a hydrogen bond in the above-mentioned polyamide resin molded article, in addition to an organic solvent capable of dissolving a polyamide resin, the compound (1), which cleaves a hydrogen bond in a polyamide resin molded article while assisting the dissolution thereof and a polyamide resin. A resin for molding is a nylon 66 resin in only Examples 32 and 33, and is a nylon 6 in all the rest of Examples. As the test results, the resins are joined with a joining strength equal to the material strength of an integral molded article of a polyamide resin (Comparative Examples 1 and 3), and with an overwhelmingly superior joining strength to that of Comparative Examples 2 and 4. In addition, for each of the joining auxiliary agents of Examples 1 to 7, the credibility of the joining strength can be increased.

In addition, any of the joining auxiliary agents of Examples 14 to 22 contains two types of organic solvents and one type of compound (1), however, while the agents of Examples 14 to 16 do not contain a polyamide resin, the agents of Examples 17 to 22 contain a polyamide resin, which is a different point. With regard to the agents of Examples 17 to 22, which contain a polyamide resin, the tensile strength is increased and the standard deviation is decreased compared to that of Examples 14 to 16, which do not contain it. In terms of these points, the effect of a polyamide resin as a composition of a joining auxiliary agent has been proved.

Figure 8:
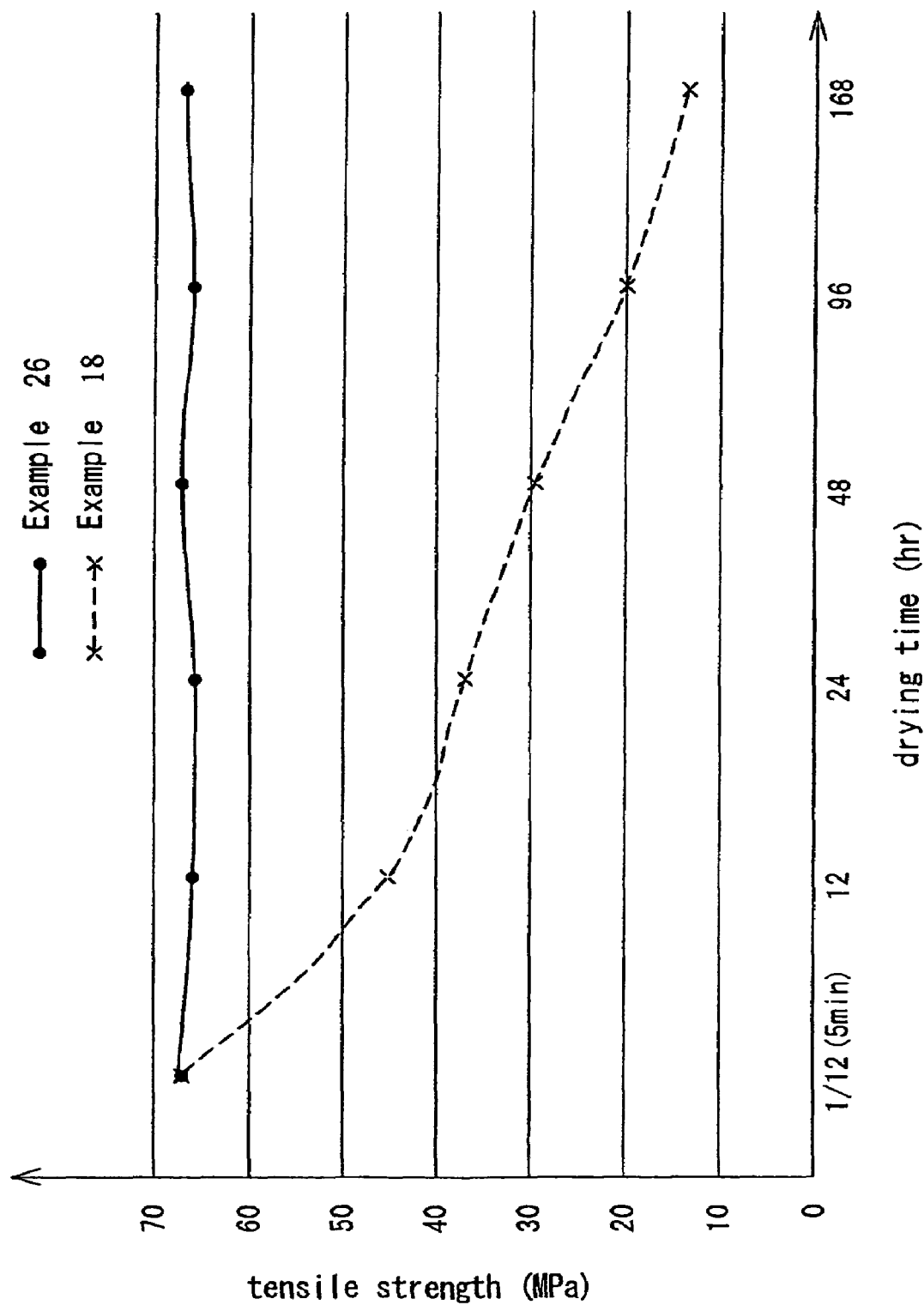
FIG. 8 is a graph showing the relationship of the joining strength (tensile strength) to the time from coating with a joining auxiliary agent to completing of the molding in the case where a test piece $T_1$ is injected and molded by using the joining auxiliary agents of Example 26 and Example 18.

In addition, FIG. 8 shows the results of applying a joining auxiliary agent, performing molding at every predetermined time interval and performing a test. The dashed line indicates the change for the agent of Example 18, which does not contain a compound (2), showing that the joining strength decreases as time goes on. On the other hand, the solid line indicates the change for the agent of Example 26, which contains a compound (2), showing that the joining strength is maintained without decreasing even as time goes on.

Subsequently, with reference to figures, the events in the present invention will be described in order. As shown in FIG. 1, the existing molded article portion $T_{11}$, which has been injected and molded in advance, is coated with, the joining auxiliary agent of Example 23 here on the predetermined joining face 3 corresponding to the end face having a width of W and a thickness of K, which is a narrowed portion thereof. Soon after the coating, the joining auxiliary agent slightly dissolves the predetermined joining face 3 and loosens the crystal of the nylon 6. Then, the hydroxyl group of added 1,3-dihydroxybenzene and the hydroxyl group and the carboxyl group of 3,5-dihydroxybenzenecarboxylic acid catch the bonds of the hydrogen bonds in the loosened nylon 6 resin. At this time, the benzene rings of 1,3-dihydroxybenzene and 3,5-dihydroxybenzenecarboxylic acid are hydrophobic nonpolar groups, which have an affinity for a methylene chain of the nylon 6, therefore, they are mutually attached automatically, whereby the portions of the hydroxyl groups can be conveniently arranged on the surface of the predetermined joining face 3.

Figure 9:
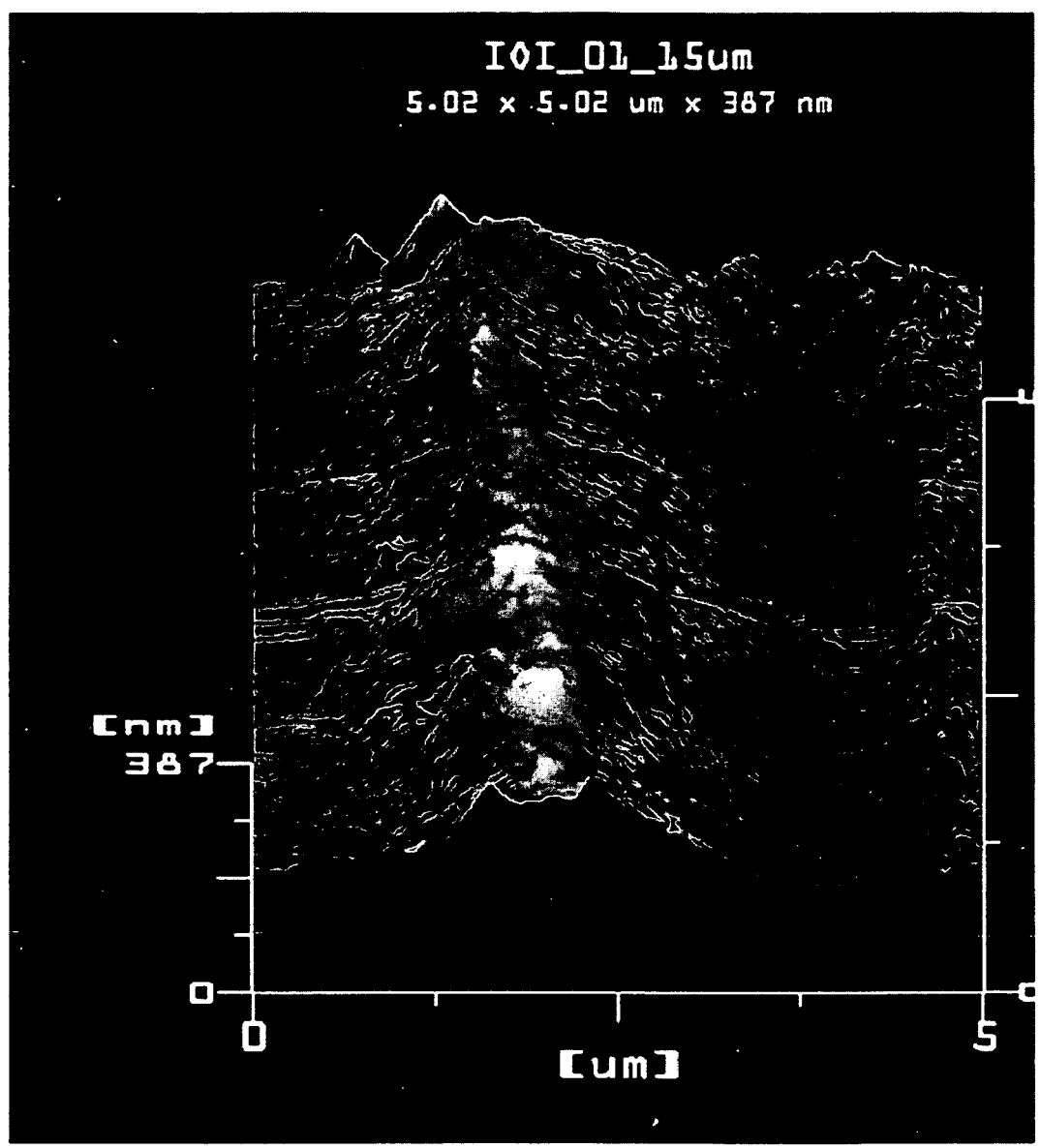
FIG. 9 shows the AFM measurement result of the surface of a predetermined joining face 3 before being coated with a joining auxiliary agent.
Figure 10:
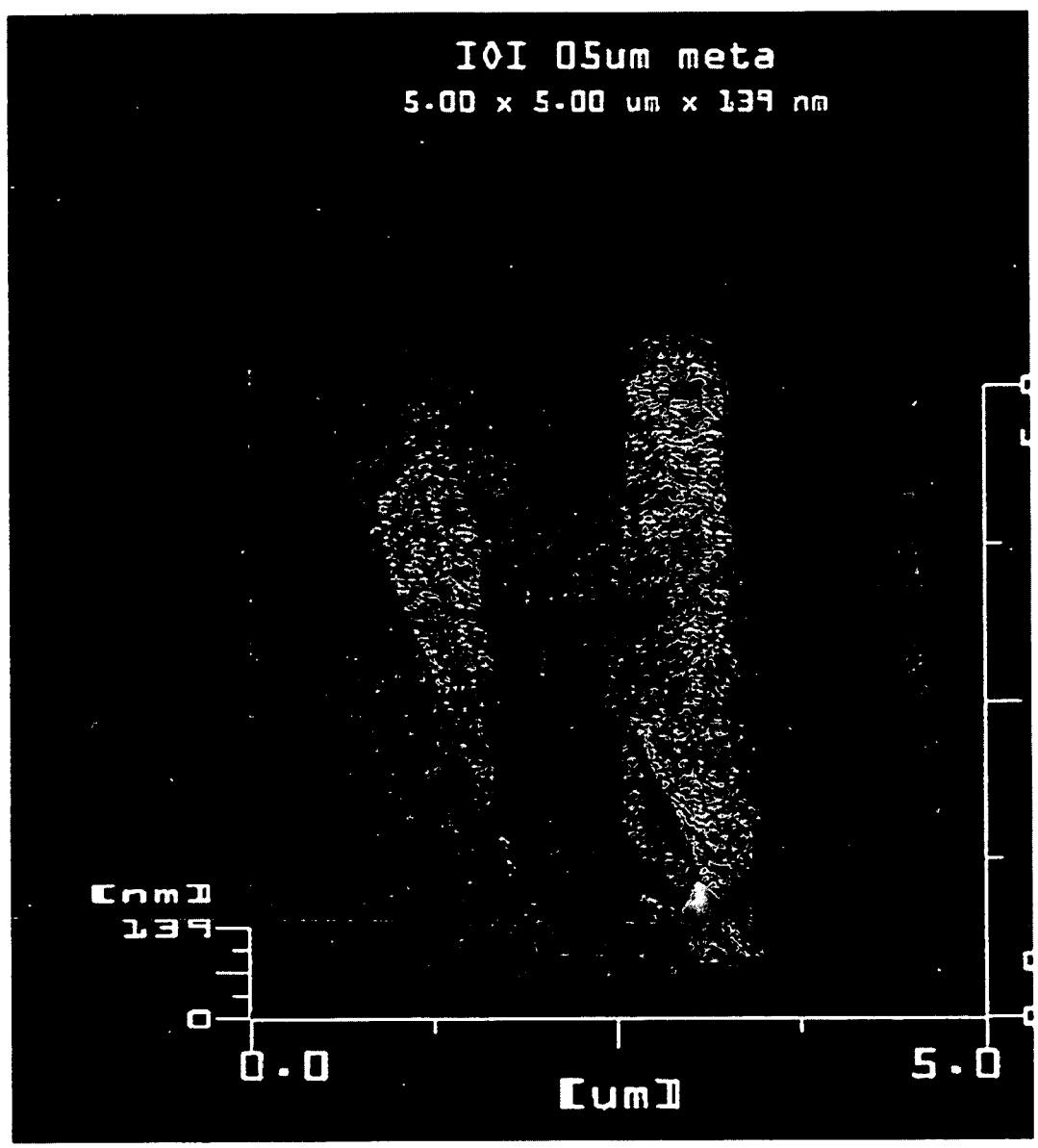
FIG. 10 shows the AFM measurement result of a predetermined joining face 3 coated with only methanol in a similar manner.

The state in which the predetermined joining face 3 is slightly dissolved as described above can be confirmed by measuring it with an AFM on a 5-µm scale. Here, FIG. 9 shows the AFM measurement result of the surface of the predetermined joining face 3 (before being coated with a joining auxiliary agent), and FIG. 10 shows the one after the predetermined joining face 3 was coated with only methanol. As shown in the figures, the noise portions (convexes that cannot be measured on a 5-µm scale because they are too large) shown to be in a sharp shape such as two triangular portions and the like in the upper left end region of FIG. 9 have disappeared in FIG. 10, which indicates that nylon 6 of the predetermined joining face 3 was dissolved with methanol. In addition, in the joining auxiliary agent, 1,3-dihydroxybenzene and 3,5-dihydroxybenzenecarboxylic acid are dissolved other than methanol and isopropyl alcohol, which are organic solvents, and these compounds promote the dissolution of the predetermined joining face 3. Methanol and isopropyl alcohol in the joining auxiliary agent evaporates soon after being applied, however, 1,3-dihydroxybenzene remains for a while without evaporating, and moreover, 3,5-dihydroxybenzenecarboxylic acid (CAS number: RN (99-10-5)) does not evaporate, therefore, the amorphous state of the surface of the polyamide resin of the predetermined joining face can be maintained for a long time. Accordingly, even if another polyamide resin to be joined and the polyamide resin of the original molded article to be joined are not necessarily subjected to a joining treatment soon after applying the joining auxiliary agent, the joining strength of the both polyamide resins is not lost, therefore, they can apply to a variety of joining operation steps.

Figure 11:
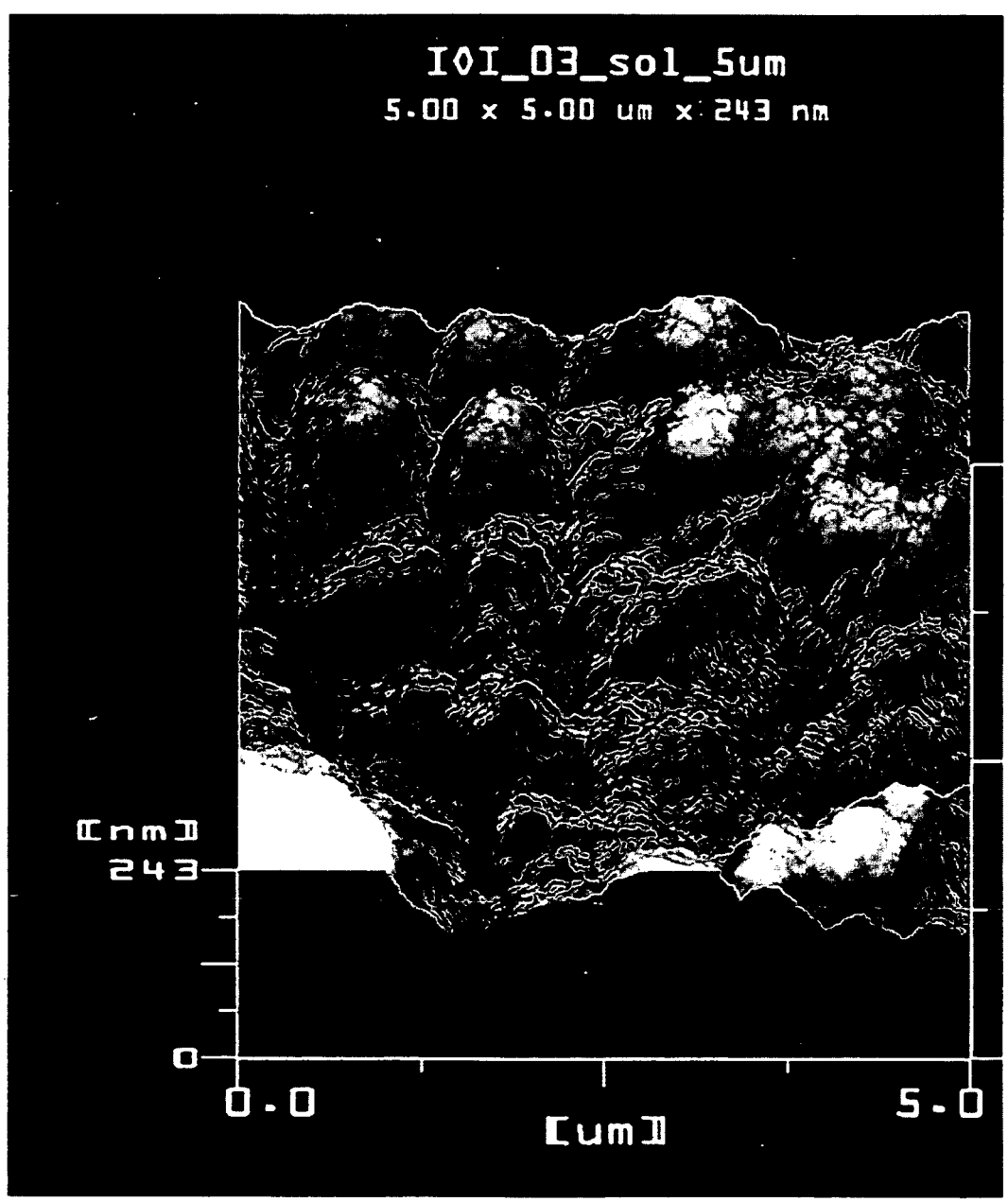
FIG. 11 shows the AFM measurement result of a predetermined joining face 3 five minutes after being coated with a joining auxiliary agent in a similar manner.
Figure 12:
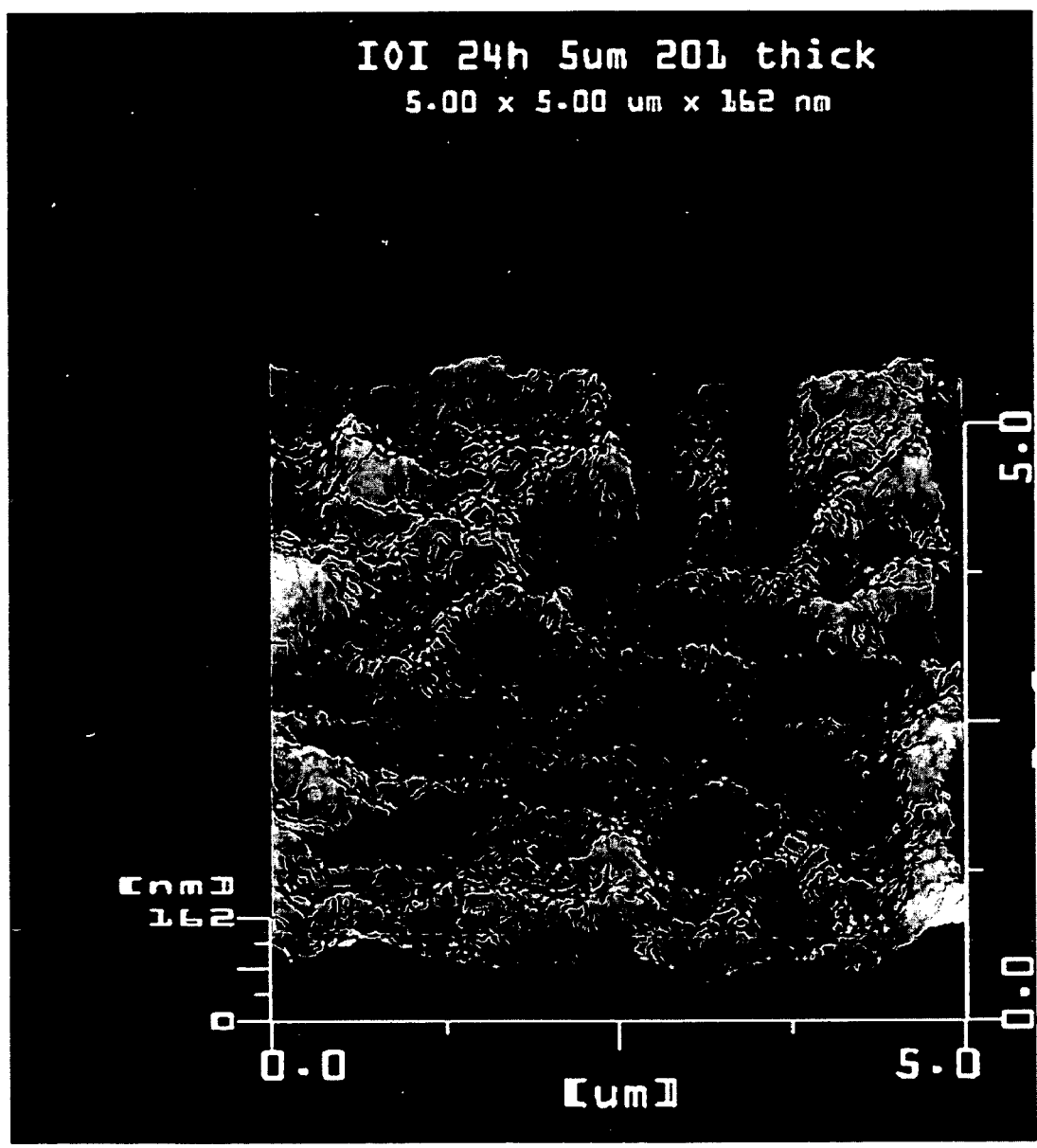
FIG. 12 shows the AFM measurement result of a predetermined joining face 3 twenty-four hours after being coated with a joining auxiliary agent in a similar manner.
Figure 13:
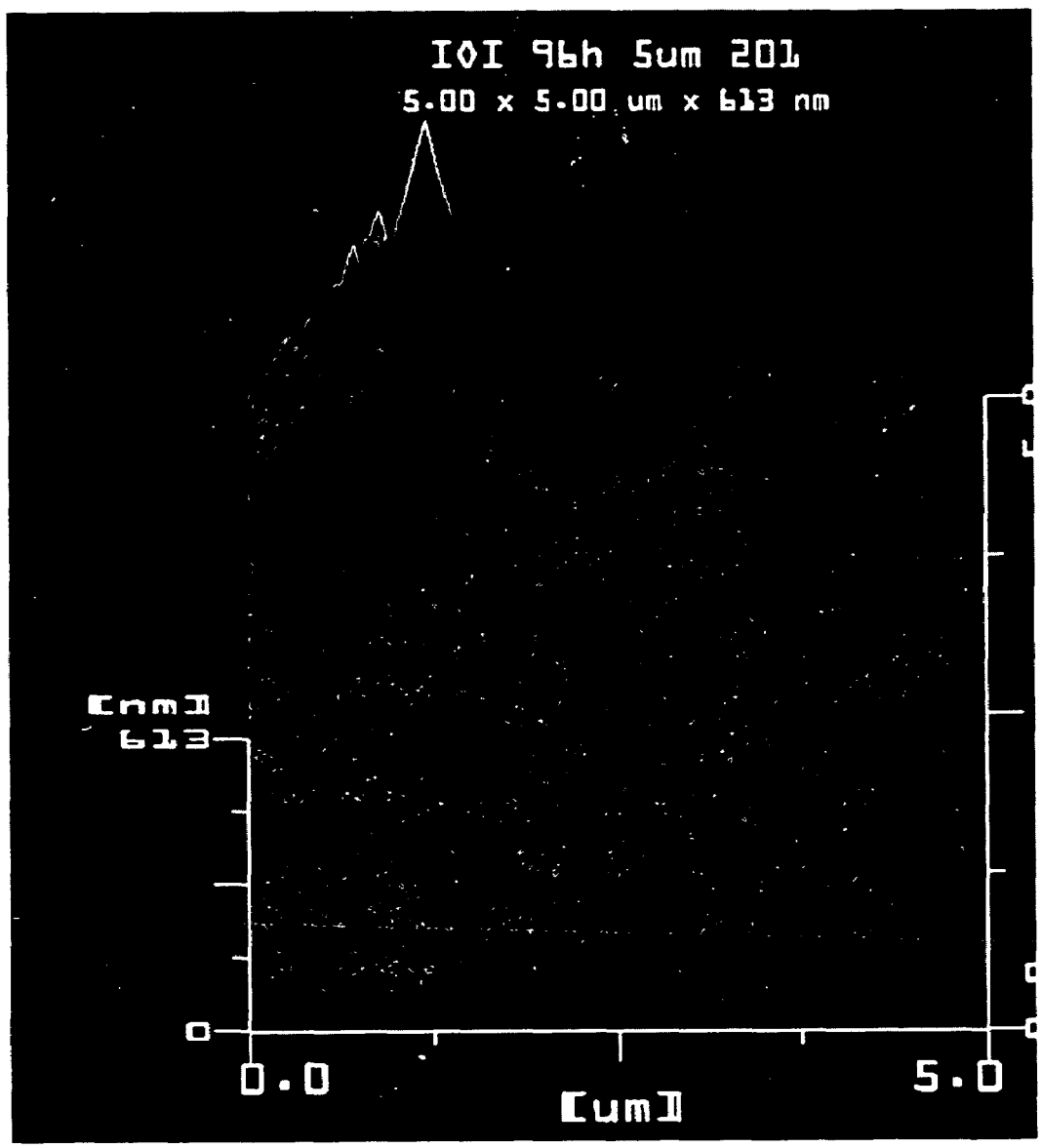
FIG. 13 shows the AFM measurement result of a predetermined joining face 3 ninety-six hours after being coated with a joining auxiliary agent in a similar manner.

The state in which the predetermined joining face 3 is deformed as described above has been confirmed by measuring it with the above-mentioned AFM. FIG. 11 to FIG. 13 show the AFM measurement results of the predetermined joining face 3, 5 minutes, 24 hours and 96 hours after being coated with the joining auxiliary agent, respectively. As shown in the figures, with regard to the surface of the predetermined joining face 3, 5 minutes after the coating, the above-mentioned noise shown in FIG. 9 has disappeared and has been deformed into a less uneven surface, and as time goes on, for example after 24 hours and 96 hours, the dissolution has proceeded, whereby the above-mentioned unevenness has become further smooth. In this way, it could be confirmed that the action of the agent that continues to act on the predetermined joining face 3 in a dry state, while changing the partner resin for a hydrogen bond, dissolves and deforms the predetermined joining face 3 lasts for a long time to a certain degree.

In addition, the crystalline nature of the polyamide resin of the predetermined joining face 3 and the association state of the amide bonds can be confirmed by the infrared absorption spectra. In general, with regard to the infrared absorption spectrum of a polymer, the crystalline degree can be deduced by finding the absorption region specific to the crystalline region and the absorption region specific to the amorphous region. The absorption of the crystalline nature of nylon 6 is located at 1030 and 936 cm$^{-1}$, and the respective absorptions of amorphous form corresponding to these are located at 990 and 1139 cm$^{-1}$ in this order. Only the increase and decrease in the spectra for the predetermined joining face 3 of the existing molded article portion $T_{11}$ coated with the joining auxiliary agent of Example 23 before and after the coating over an about 3-day period were plotted out and analyzed. As a result, in the vicinity of 1000 cm$^{-1}$, while the absorption lines indicating the crystalline nature decrease, the absorption lines indicating the amorphous form increase instead, which occurs in pairs, and in the vicinity of 936 cm$^{-1}$, while the absorption lines indicating the crystalline nature decrease, the absorption lines at 1139 cm$^{-1}$, which increases instead, which occurs in pairs, by being made to be amorphous, can be confirmed.

In addition, the characteristic absorptions of the amide bond are the absorption of amide I caused by the carbonyl group and the absorption caused by N—H. The respective absorptions indicating the association state are located at 1650 cm$^{-1}$ and 3360 cm$^{-1}$, respectively, and the absorptions indicating the non-association state corresponding to these are located at 1690 cm$^{-1}$ and 3420 cm$^{-1}$, respectively. As a result of performing the analysis by the infrared absorption spectra in the same manner as above, a pair of absorptions in which the absorption at 1650 cm$^{-1}$ decreases and the absorption at 1690 cm$^{-1}$ showing non-association increases instead has been confirmed, and in the case of N—H, a similar pair of absorptions have been confirmed.

Figure 14:
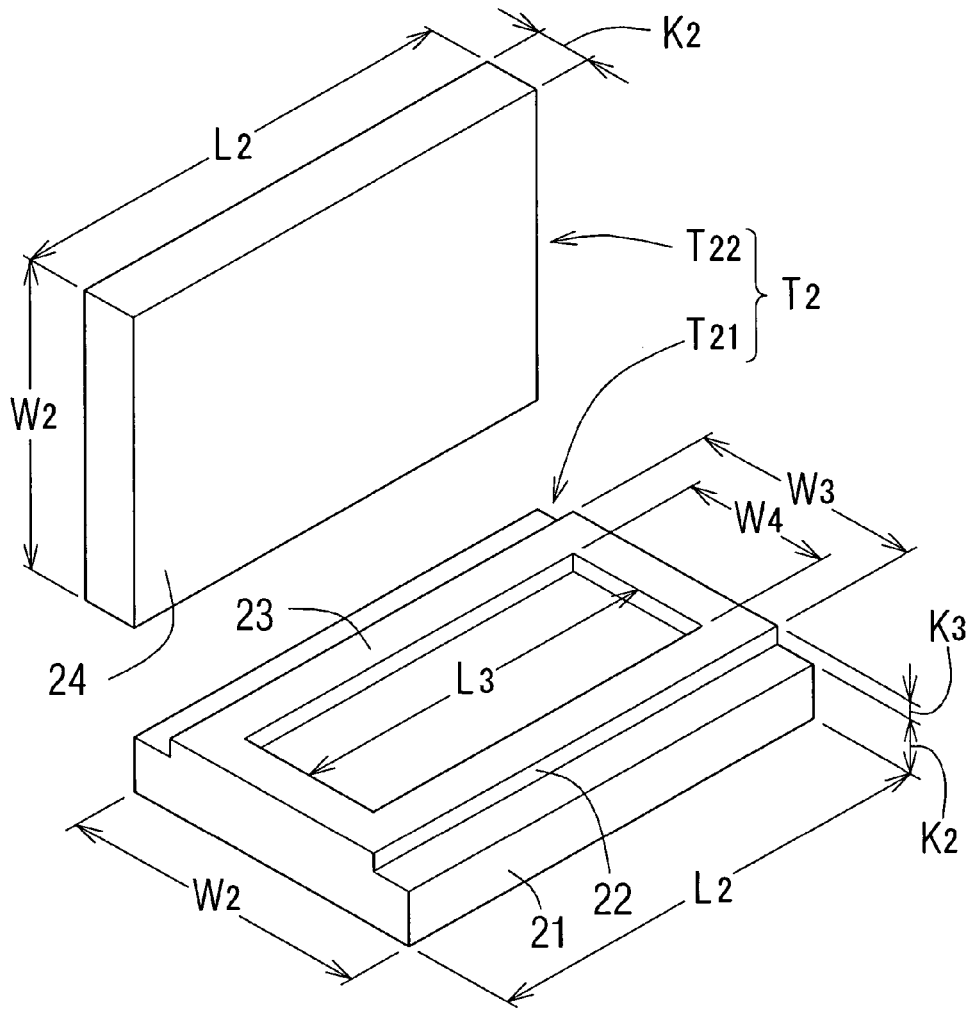
FIG. 14 is a perspective view of one set of a first test piece $T_{21}$ and a second test piece $T_{22}$ for ultrasonic welding in a separate state.
Figure 15:
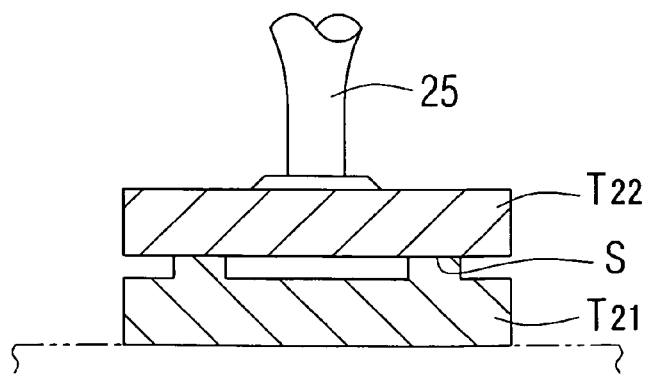
FIG. 15 is a cross-sectional view of the same at welding.

Subsequently, when polyamide resin molded articles are joined by ultrasonic welding, the joining strengths between the case where the joining face is coated with a joining auxiliary agent according to the present invention and the case where it is not coated with it were compared and a confirmation test of the joining effect of the joining auxiliary agent according to the present invention on the ultrasonic welding were carried out as follows, which will be described. A test piece $T_2$ is composed of one set of a first test piece $T_{21}$ and a second test piece $T_{22}$, and the one with the shape shown in FIG. 14 and FIG. 15 was used. The first test piece $T_{21}$ has a plate form, in which a rectangular frame-like protruding portion 22 is integrally formed on a rectangular substrate portion 21 and the surface of the protruding portion 22 became the joining face 23, and the second test piece $T_{22}$ has a plate form and the same shape as the rectangular substrate portion 21 of the first test piece $T_{21}$ and its surface became the joining face 24. Both of the substrate portion 21 of the first test piece $T_{21}$ and the second test piece $T_{22}$ have dimensions of length ($L_2$)× width ($W_2$)×thickness ($K_2$)=25×17×3 mm. The outer dimensions ($L_2$×$W_3$) and the inner dimensions ($L_3$×$W_4$) of the protruding portion 22 of the first test piece $T_{21}$ are (25×12.6 mm) and (20.4×8 mm), respectively, and the thickness ($K_3$) of the above-mentioned protruding portion 22 is 1 mm. Incidentally, the respective joining faces 23 and 24 of the respective test pieces $T_{21}$ and $T_{22}$ were in a state without modification after being molded and were not subjected to a surface-roughening process (process for making a joining face rough).

Then, the entire surface of the joining face 23 of the first test piece $T_{21}$ was coated with the joining auxiliary agent of the above-mentioned Example 1 of the present invention, thereafter, the joining face 23 of the first test piece $T_{21}$ and the joining face 24 of the second test piece $T_{22}$ were brought into close contact with each other. Then, vibration was applied by placing an oscillator 25 of an ultrasonic vibrator on the upper side of the second test piece $T_{22}$, whereby ultrasonic welding was carried out. The ultrasonic vibrator used here was "8300, manufactured by BRANSON" and the welding time and welding strength were 0.4 sec and 392 N, respectively.

Figure 16:
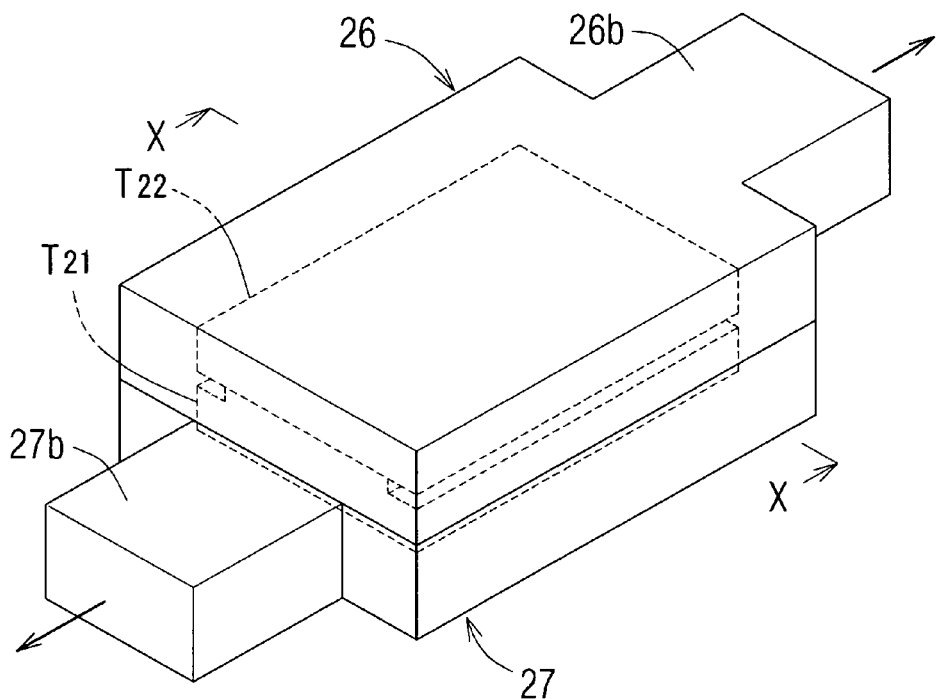
FIG. 16 is a perspective view showing a state in which a shearing test is carried out for the respective joined test pieces $T_{21}$ and $T_{22}$.
Figure 17:
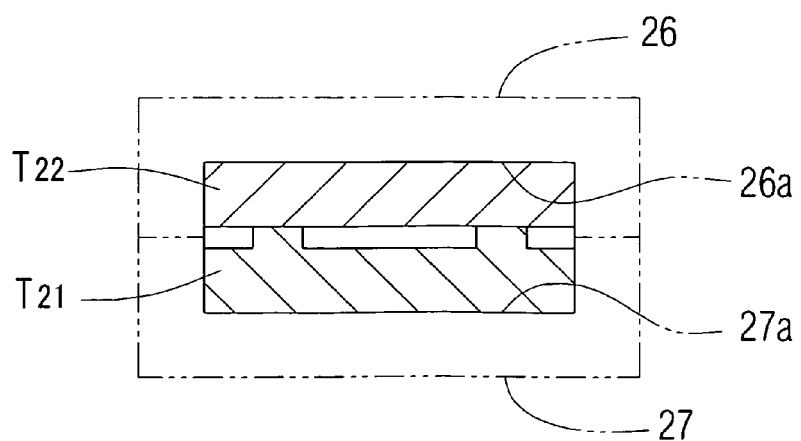
FIG. 17 is a cross-sectional view along the line X-X in FIG. 16.

In addition, as shown in FIG. 16 and FIG. 17, the outsides of the respective first and second test pieces $T_{21}$ and $T_{22}$ joined as above were covered with separate tension members 26 and 27, respectively, and the joined respective test pieces $T_{21}$ and $T_{22}$ were housed in their recesses 26a and 27a, respectively. The respective tension members 26 and 27 are connected with a connecting member (not shown) so as not to be separated in a state in which the respective tension members 26 and 27 are allowed to slide in the direction of pulling them. On the opposite faces of the respective tension members 26 and 27, gripping pieces 26b and 27b for being gripped by the gripping portion of a tensile testing machine are integrally provided in a protruding manner, respectively. In this way, the respective gripping pieces 26b and 27b of the respective tension members 26 and 27 are gripped by the gripping portion of the tensile testing machine, and when one side thereof is fixed and a tensile strength was applied to the other side, a "shearing strength" acts on the joining portion S of the respective first and second test pieces $T_{21}$ and $T_{22}$, and by measuring this "shearing strength", the joining strength was determined. This "shearing strength" acts on the vertical direction to the paper in FIG. 17.

In addition, as the tensile testing machine, above-mentioned instron type universal testing machine, "INSTRON 4505" was used. The test was carried out 5 times on the respective samples by using the above-mentioned test piece $T_1$ under the same conditions with regard to the nylon 6 resin and the nylon 66 resin, and the cases where the joining auxiliary agent of Example 1 of the present invention was used and was not used, whereby the "shearing strength" of the respective first and second test pieces $T_{21}$ and $T_{22}$, which had been joined was measured. The measurement test results are shown in FIG. 18. In any test, the "sheared (ruptured) region" of the respective joined first and second test pieces $T_{21}$ and $T_{22}$ was not the joining portion S, but either one of the test pieces $T_{21}$ and $T_{22}$. Here, as the nylon 6 resin, Novamid 101, 3CH5 (manufactured by Mitsubishi Engineering-Plastics Co., Ltd) was used, and as the nylon 66 resin, Novamid 3010SR (manufactured by Mitsubishi Engineering-Plastics Co., Ltd) was used. Incidentally, in the case where the joining auxiliary agent of the present invention was not used, the joining was not sufficient at a welding time of 0.4 sec, therefore, the welding time was changed to 0.8 sec.

In the case of the nylon 6 resin, when, for example, the joining auxiliary agent of Example 23 was used, the "average shearing strength" is 17.8 MPa, however, when it was not used, the "average shearing strength" is 3.4 MPa, and a more than 5-fold increase in "shearing strength" could be confirmed. In a similar manner, in the case of the nylon 66 resin, by using the joining auxiliary agent of Example 1 of the present invention, a more than 12-fold increase in "shearing strength" could be confirmed. It is understood that the theory of the increase in this "shearing strength (joining strength)" is substantially the same as the case of the test piece $T_1$ which had been subjected to additional molding by injection molding as described above. In addition, even by using a joining auxiliary agent of another Example of the present invention, it is assumed that the joining strength is dramatically increased in the same manner as using the joining auxiliary agent of Example 23, though there is a difference in the increasing ratio of the joining strength.

The invention claimed is:
1. A joining auxiliary agent which comprises
a compound (1) capable of cleaving a hydrogen bond in a polyamide resin molded article while assisting dissolution of the polyamide resin, which is selected from a monovalent to trivalent phenol, a compound (2), which maintains the action of cleaving a hydrogen bond of the compound (1), which is selected from a carboxylic acid derivative of a monovalent to trivalent phenol, and an organic solvent capable of dissolving the polyamide resin.

2. The joining auxiliary agent according to claim 1, which further comprises a polyamide resin dissolved and contained in the joining auxiliary agent.

3. The joining auxiliary agent according to claim 2, wherein the polyamide resin molded article is nylon 6 or nylon 66, and the polyamide resin contained in the joining auxiliary agent is identical to the polyamide resin in the molded article.

4. The joining auxiliary agent according to claim 3, wherein the polyamide resin is at 0.005% to 1.000% by weight based on the joining auxiliary agent.

5. A method for joining a predetermined joining face of a polyamide resin molded article to another polyamide resin, which comprises coating the predetermined joining face with the joining auxiliary agent of claim 2, and joining the other polyamide resin to the coated face.

6. The joining auxiliary agent according to claim 1, wherein the organic solvent in the joining auxiliary agent is an organic solvent having a molecular weight of 120 or less.

7. The joining auxiliary agent according to claim 6, wherein the organic solvent is at 50% to 90% by weight based on the joining auxiliary agent.

8. The joining auxiliary agent according to claim 1, wherein the organic solvent is a mixed solvent of plural organic solvents.

9. The joining auxiliary agent according to claim 8, wherein the organic solvent comprises two organic solvents, and their ratio by weight is 0.01 to 100.

10. The joining auxiliary agent according to claim 1, wherein the compound (1) capable of cleaving a hydrogen bond in the polyamide resin molded article is 1,3-dihydroxybenzene (CAS number: RN (108-46-3)), and the compound (2) which maintains the action of cleaving a hydrogen bond of 1,3-dihydroxybenzene (CAS number: RN (108-46-3)) is 3,5-dihydroxybenzenecarboxylic acid (CAS number: RN (99-10-5)) or/and salicylic acid (CAS number: RN (69-72-7)).

11. The joining auxiliary agent according to claim 10, wherein the ratio by weight of 1,3-dihydroxybenzene (CAS number: RN (108-46-3)) and 3,5-dihydroxybenzenecarboxylic acid (CAS number: RN (99-10-5)) is 0.001 to 1000.

12. The joining auxiliary agent according to claim 10, wherein the organic solvent is methanol.

13. A method for joining a predetermined joining face of a polyamide resin molded article to another polyamide resin, which comprises coating the predetermined joining face with the joining auxiliary agent of claim 12, and joining the other polyamide resin to the coated face.

14. The joining auxiliary agent according to claim 1, wherein the compound (1) is at 10% to 50% by weight based on the joining auxiliary agent.

15. A method for joining a predetermined joining face of a polyamide resin molded article to another polyamide resin, which comprises coating the predetermined joining face with the joining auxiliary agent of claim 1, and joining the other polyamide resin to the coated face.

* * * * *